United States Patent Office 3,555,123
Patented Jan. 12, 1971

---

3,555,123
DI-OMEGA-ALKYNYL ARYL(ARYLALKYL) PHOSPHONATES
Milton H. Fischer, 4032 Perry Ave. N., Robbinsdale, Minn. 55422; Harry H. Incho, 137 Ensign Ave., Medina, N.Y. 14103; and Paul E. Drummond, 54 S. Vernon St., and Ronald E. Montgomery, 46 S. Vernon St., both of Middleport, N.Y. 14105
No Drawing. Continuation-in-part of application Ser. No. 540,175, Apr. 5, 1966. This application June 23, 1966, Ser. No. 559,745
Int. Cl. A01n 9/36; C07f 9/38
U.S. Cl. 260—956　　　　　　　　　　　　　　　　　9 Claims

ABSTRACT OF THE DISCLOSURE

Insecticidal esters of chrysanthemumic acid, e.g. pyrethrins, allethrin, etc., form synergistic insecticidal compositions in combination with phosphonates having the formula:

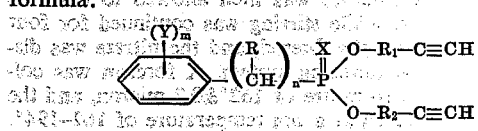

wherein $R_1$ and $R_2$ are lower alkylene groups; R is hydrogen, halogen, a lower alkyl or alkoxy group, or a substituted or unsubstituted phenyl; n is an integer from 0 to 3, X is oxygen or sulfur; and Y represents a variety of substituents. The preparation and properties of representative members of this new class of synergistic phosphonates are described, and test results of their synergistic combinations with representative chrysanthemumates are reported.

---

This application is a continuation-in-part of co-pending application Ser. No. 540,175, filed April 5, 1966, now abandoned.

This invention relates to novel insecticidal compositions and in particular to insecticidal compositions containing pyrethrins, allethrin, or related insecticidal cyclopropanecarboxylic acid esters, in combination with certain novel synergists for insecticidal activity.

Among the most widely used insecticides today are the pyrethrins, the active principle of pyrethrum flowers (*Chrysanthemum cinerariaefolium*), which have a high order of insecticidal activity and a low mammalian toxicity. The relatively high cost and the uncertain supply of pyrethrins have encouraged attempts to prepare synthetic insecticides which retain the desirable properties of pyrethrins. It has long been known that synthetic products having a basic structural similarity to pyrethrins in that they are esters of 2,2-dimethyl-3-(2-methylpropenyl)-cyclopropanecarboxylic acid (which is also known as chrysanthemumic acid and will be so referred to herein) exhibit insecticidal activity of a significant order. However, these synthetic chrysanthemumates are expensive and for the most part their degree of insecticidal activity is lower than that of pyrethrins.

The wide market which pyrethrins and related synthetic insecticides enjoy today is due primarily to the discovery of certain additives which enhance the activity of these insecticides. These additives, commonly called synergists, are agents which may or may not themselves exhibit insecticidal activity but which when combined with pyrethrins or related compounds produce new insecticides, having an effectiveness significantly greater than the sum of the effectiveness of the components when used separately. A great deal of time and effort has been devoted to the search for effective synergists. One of the most effective and most widely used of the pyrethrins synergists is the compound piperonyl butoxide, which is described in synergistic combination with pyrethrins in Wachs U.S. Patent 2,550,737. Unfortunately, it has been found that many compounds which are excellent synergists for pyrethrins are not nearly as effective when used with allethrin or other synthetic cyclopropanecarboxylic acid esters.

We have now discovered that chemical compounds of the class of certain aryl- and aralkylphosphonate ω-alkynyl esters are effective synergists for the insecticidal activity of esters of cyclopropanecarboxylic acids such as the chrysanthemumates. These synergistic phosphonates have the structural formula:

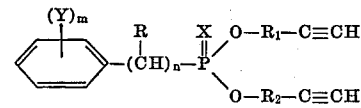

wherein $R_1$ and $R_2$ are each alkylene groups of one to about six carbon atoms, straight or branched chain, and may be the same or different; R is hydrogen, halogen, phenyl, substituted phenyl, a lower alkyl or a lower alkoxy group; n is an integer from 0 to 3 inclusive; Y may be hydrogen or may represent one or more substituents including methylenedioxy, lower alkyl, lower alkoxy, lower alkylthio, nitro, halogen, cyano, acyloxy, acylamino, di-(lower alkyl)amino, acyl, and alkoxycarbonyl; m is an integer from 0 to 5 inclusive; and X is oxygen or sulfur. The phenyl nucleus illustrated is representative of other aryl groups effective herein, including naphthyl and pyridyl groups.

Among preferred compounds of this class are the phenyl- and benzylphosphonates of the following structure:

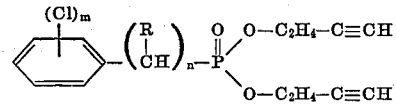

wherein R is hydrogen or methyl; n is 0 or 1; the phenyl nucleus is either unsubstituted or chloro-substituted; and m is 0, 1, or 2. The ω-butynyl groups may be straight- or branched-chain.

Of the natural and synthetic esters of cyclopropanecarboxylic acids the best known members, preferred for use herein because of their general insecticidal activity and availability, are the esters of chrysanthemumic acid, which have the general structure:

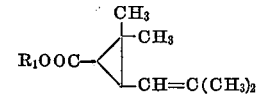

and wherein the radical $R_1$ can be any of the very large number of radicals which have been found to form insecticidal chrysanthemumates. For example, this class of esters includes the pyrethrins, allethrin (3-allyl-2-methyl-4-oxo-2-cyclopentenyl chrysanthemumate) and related insecticides as described by Schechter and LaForge in U.S. Patent 2,661,374; cyclethrin (3-(2-cyclopentenyl)-2-methyl-4-oxo-cyclopentenyl chrysanthemumate) as described by Guest and Stansbury in U.S. Patent 2,891,888; furethrin (3 - furfuryl-2-methyl-4-oxo-2-cyclopentenyl chrysanthemumate) as described in National Distillers Products British Patent 678,309; barthrin (6-chloropiperonyl chrysanthemumate) and its bromo analog, as described by Barthel et al. in U.S. Patent 2,886,485; dimethrin (2,4-dimethylbenzyl chrysanthemumate) and the 3,4-dimethyl isomer, as described by Barthel in U.S. Patent 2,857,309; compounds of the classes of (cyclohexene-1,2-dicarboximido) methyl chrysanthemumates as described in Belgian Patent 646,399 and cyclohexadiene-1,2-dicarboximido chrysanthemumates as described in Belgian Patent 651,737, both to the Sumitomo Chemical Company, Ltd.; and related compounds such as phthalimidoalkyl and substituted phthalimidoalkyl chrysanthemumates, as described in Sumitomo Belgian Patent 635,902. Other insecticidal esters of chrysanthemumic acid also form synergistic combinations with the phosphonates of this invention.

The preparation of the ω-alkynyl aryl- and aralkylphosphonates described herein and their synergistic insecticidal properties are illustrated in the following examples, which are not intended to be limitative of the wide variety of procedures which are applicable to the synthesis of ω-alkynyl phosphonates, or of the many insecticidal combinations in which they are effective. In these examples, all temperatures are in degrees centigrade.

EXAMPLE 1

Preparation of di - 2 - propynyl [4,5 - (methylenedioxy)- 2 - propylbenzyl]phosphonate 4,5 - methylenedioxy-2-propylbenzyl iodide was prepared as follows: A solution of 34.2 g. of 4,5-methylenedioxy-2-propylbenzyl chloride and 30.7 g. of sodium iodide in 65 ml. of acetone was stirred under reflux for 30 minutes. The precipitated sodium chloride was removed by filtration. The filtrate was concentrated and the concentrate dissolved in ether, the ether solution was shaken with a few drops of mercury, treated with activated charcoal, and then concentrated. The resulting brown solid was recrystallized from hexane to give 14.9 g. of 4,5-methylenedioxy-2-propylbenzyl iodide, M.P. 59–60°.

4,5 - methylenedioxy-2-propylbenzylphosphonic dichloride was prepared from the above material as follows: A mixture of 9.4 g. of ethyl phosphorodichlorite and 15.0 g. of 4,5-methylenedioxy-2-propylbenzyl iodide was heated until the quantitative amount of ethyl iodide was distilled. An ether solution of the reaction mixture was stirred with elemental mercury to remove iodine, then decanted from the mercury and filtered. The filtrate was distilled to yield 6.4 g. of 4,5-methylenedioxy-2-propylbenzyl phosphonic dichloride, B.P. 149–150°/ca. 0.25 micron, which solidified on standing.

This material was esterified as follows: A solution of 9.7 g. of propargyl alcohol and 17.5 g. of triethylamine in 100 ml. of diethyl ether was placed in a flask, chilled, and purged with nitrogen. A solution of 20 g. of 4,5-methylenedioxy-2-propylbenzylphosphonic dichloride in 50 ml. dry ether was added slowly during 30 minutes. When addition was complete, the mixture was allowed to warm slowly to room temperature. Stirring was continued for 4 hours. The mixture was filtered, and the filtrate was distilled under reduced pressure to give di-2-propynyl[4,5-(methylenedioxy)-2-propylbenzyl]phosphonate which, on redistillation, distilled at 171–5°/0.1 micron.

*Analysis.*—Calc'd for $C_{17}H_{19}PO_5$ (percent): C, 61.08; H, 5.73; P, 9.27. Found (percent): C, 61.01; H, 5.69; P, 9.13.

EXAMPLE 2

The synergistic activity of di-2-propynyl[4,5-(methylenedioxy)-2-propylbenzyl]phosphonate The synergistic activity of di-2-propynyl[4,5-(methylenedioxy)-2-propylbenzyl]phosphonate with allethrin was determined by the following test procedure: The test compound and allethrin were dissolved in a solvent of 70 parts by volume of acetone, which was then made up to 100 parts by addition of water. A group of thirty to forty houseflies (*Musca domestica* L.), immobilized under carbon dioxide, was placed on a moist filter paper held on a Buchner funnel attached to a vacuum source. Twenty-five ml. of the test solution was poured over the immobilized flies, this being sufficient volume that all were completely immersed. Vacuum was then applied to remove the test solution, and the flies were transferred to holding cages lined with absorbent paper. Mortality counts were made after 24 hours. Results are shown in Table 1, for varying ratios and concentrations of synergist and allethrin. In this and subsequent tables, the amounts of the test ingredients are stated in concentration terms of mg. per 100 ml. of test solution.

TABLE 1
[COMPOSITIONS OF DI-2-PROPYNYL [4,5-(METHYLENEDIOXY)-2-PROPYLBENZYL]PHOSPHONATE AND ALLETHRIN]

| Synergist, milligrams | Allethrin, milligrams | Mortality of houseflies, percent |
|---|---|---|
| 500 | 5 | 100 |
| 50 | 5 | 100 |
| 50 | None | 0 |
| None | 5 | 6 |

EXAMPLE 3

Preparation of di-3-butynyl phenylphosphonate

A mixture of 15.1 g. 3-butyn-1-ol and 21.9 g. triethylamine in 100 ml. diethyl ether was placed in a flask and chilled in an ice bath while the system was purged with dry nitrogen. A solution of 20.0 g. of phenylphosphonic dichloride in 75 ml. of dry ether was slowly added during 30 minutes. The mixture was then allowed to come to room temperature, while stirring was continued for four hours. The mixture was filtered, and the filtrate was distilled using an oil diffusion system. A forerun was collected to a pot temperature of 162°&0.2 micron, and the product was collected at a pot temperature of 162–194°. The crude product was redistilled at a pressure less than 0.1 micron, to give di-3-butynyl phenylphosphonate which distilled from a pot at 162° (head temperature 122–130°) after a small forerun.

*Analysis.*—Calc'd for $C_{14}H_{15}O_3P$ (percent): C, 64.12; H, 5.77; P, 11.81. Found (percent): C, 63.97; H, 5.77; P, 11.65.

EXAMPLES 4–8

The synergistic activity of di-3-butynyl phenylphosphonate with a wide variety of chrysanthemumate esters was evaluated against houseflies by the following procedure: About one microliter of a solution containing the indicated amount of the test materials in 100 ml. of acetone was applied topically to each of 35 to 45 three-to four-day old houseflies (*Musca domestica*) in one to four replicates. After twenty-four hours the mortality was determined by physical counting of the dead and living flies, and the percent kill was calculated. Results are shown in Table 2.

TABLE 2.—COMPOSITIONS OF DI-3-BUTYNYL PHENYLPHOSPHONATE AND CHRYSANTHEMUMATES

| Chrysanthemumate | Milligrams | Synergist, milligrams | Mortality of houseflies, percent |
|---|---|---|---|
| Cyclethrin | 14.4 | 72 | 80 |
|  | None | 150 | 9 |
|  | 24 | None | 9 |
| Allethrin | 14.4 | 72 | 91 |
|  | None | 150 | 0 |
|  | 24 | None | 11 |
| Pyrethrins | 14.4 | 72 | 89 |
|  | None | 150 | 0 |
|  | 42 | None | 9 |
| Dimethrin | 14.4 | 72 | 62 |
|  | None | 150 | 0 |
|  | 150 | None | 19 |
| (1-cyclohexene-1,2-dicarboximido)methyl chrysanthemumate. | 14.4 | 72 | 99 |
|  | None | 150 | 0 |
|  | 20 | None | 20 |

The results shown in Table 2 demonstrate the general nature of the synergistic interaction between an ω-alkynyl phosphonate of this invention and chrysanthemumates. Even at dosages as high as 150 mg. this phosphonate itself was inactive, yet a consistent and substantial synergistic effect was observed when combined with chrysanthemumates which, even at relatively high concentrations, produced negligible kill of houseflies.

EXAMPLE 9

Synergistic activity was tested against the German cockroach (*Blatella germanica*) as follows: Adult, male roaches were completely immersed for about five seconds in test solutions consisting of di-3-butynyl phosphonate and the indicated chrysanthemumate ester in 50% aqueous acetone. The roaches were then transferred to holding cages, and the mortality was determined after twenty-four hours. Five replicates of nineteen or twenty roaches each were run at each concentration, which is given in the table as mg. per 100 ml. solution. The results shown in Table 3 represent the averages of each set of five replicates.

TABLE 3.—COMPOSITIONS OF DI-3-BUTYNYL PHENYLPHOSPHONATE AND CHRYSANTHEMUMATES

| Chrysanthemumate | Milligrams | Synergist, milligrams | Mortality of roaches, percent |
|---|---|---|---|
| Allethrin | 10 | 100 | 99 |
|  | None | 100 | 2 |
|  | 10 | 50 | 98 |
|  | 10 | 10 | 71 |
|  | None | 10 | 0 |
|  | 10 | None | 4 |
| (1-cyclohexene-1,2-dicarboximido)methyl 2-2-dimethyl-3-(2-methyl-1-propenyl)-cyclopropanecarboxylate. | 10 | 100 | 91 |
|  | None | 100 | 2 |
|  | 10 | 50 | 95 |
|  | 10 | 10 | 40 |
|  | None | 10 | 0 |
|  | 10 | None | 8 |

EXAMPLE 10

Preparation of di-3-butynyl (4-chlorobenzyl)phosphonate

A mixture of 12.1 g. 3-butyn-1-ol and 17.5 g. triethylamine in 100 ml. of diethyl ether was placed in a flask and chilled in an ice bath while the system was purged with dry nitrogen. A solution of 20.0 g. of 4-chlorobenzylphosphonic dichloride in 50 ml. dry ether was added slowly during 30 minutes. The mixture was then allowed to come to room temperature, while stirring was continued for four hours. The mixture was filtered, and the filtrate was distilled under reduced pressure to give, after a small forerun, 12.9 g. of pale yellow oil which distilled at a pot temperature of 168–190° (head temperature 139–145°) under 0.5–0.8 micron. Redistillation under pressure of less than one micron gave colorless liquid di-3-butynyl (4-chlorobenzyl)phosphonate (pot temperature 157–184°; head temperature 116–150°).

*Analysis.*—Calc'd for $C_{15}H_{16}ClO_3P$ (percent): C, 57.98; H, 5.19; P, 9.70. Found (percent): C, 57.78; H, 5.13; P, 9.82.

EXAMPLES 11–15

The synergistic activity of di-3-butynyl (4-chlorobenzyl)phosphonate with a wide variety of chrysanthemumate esters was evaluated against houseflies, employing the procedure described for Examples 4–8. Results are given in Table 4.

TABLE 4.—COMPOSITIONS OF DI-3-BUTYNYL (4-CHLOROBENZYL)PHOSPHONATE AND CHRYSANTHEMUMATES

| Chrysanthemumate | Milligrams | Synergist, milligrams | Mortality of houseflies, percent |
|---|---|---|---|
| Cyclethrin | 14.4 | 72 | 71 |
|  | None | 150 | 0 |
|  | 24 | None | 9 |
| Allethrin | 14.4 | 72 | 99 |
|  | None | 150 | 0 |
|  | 24 | None | 11 |
| Pyrethrins | 14.4 | 72 | 73 |
|  | None | 150 | 0 |
|  | 42 | None | 9 |
| Dimethrin | 14.4 | 72 | 62 |
|  | None | 150 | 0 |
|  | 150 | None | 19 |
| (1-cyclohexene-1,2-dicarboximido)methyl chrysanthemumate | 14.4 | 72 | 100 |
|  | None | 150 | 0 |
|  | 24 | None | 20 |

The results shown in Table 4 continue to demonstrate the general nature of the synergistic interaction between a phosphonate of this invention and a variety of chrysanthemumates. A consistent and substantial synergistic effect is observed.

EXAMPLE 16

The synergistic activity of di-3-butynyl (4-chlorobenzyl)phosphonate in combination with representative chrysanthemumates useful herein was determined against the German cockroach, following the procedure described in Example 9. Results are given in Table 5.

TABLE 5.—COMPOSITIONS OF DI-3-BUTYNYL (4-CHLOROBENZYL)PHOSPHONATE AND CHRYSANTHEMUMATES

| Chrysanthemumate | Milligrams | Synergist, milligrams | Mortality of roaches, percent |
|---|---|---|---|
| Allethrin | 10 | 100 | 100 |
|  | None | 100 | 0 |
|  | 10 | 50 | 99 |
|  | 10 | 10 | 45 |
|  | None | 10 | 0 |
|  | 10 | None | 2 |
| (1-cyclohexene-1,2-dicarboximido)methyl chrysanthemumate | 10 | 100 | 100 |
|  | None | 100 | 0 |
|  | 10 | 50 | 89 |
|  | 10 | 10 | 20 |
|  | None | 10 | 0 |
|  | 10 | None | 0 |

EXAMPLE 17

Preparation of bis(1-methyl-2-propynyl) phenylphosphonate

Following the procedure described in Example 3, 22.8 g. of 3-butyn-2-ol was reacted with 30.2 g. of phenylphosphonic dichloride. The final product was distilled using an oil diffusion system, and collected over a pot temperature of 140–176° and a head temperature of 100–128° at 0.6 micron, and then redistilled at a pot temperature of 131–138° and a head temperature of 95–101° at 2 microns.

*Analysis.*—Calc'd. for $C_{14}H_{15}O_3P$ (percent): C, 64.12; H, 5.77; P, 11.81. Found (percent): C, 63.92; H, 5.92; P, 11.61.

EXAMPLE 18

Preparation of di-3-butynyl 1-(phenyl)-ethylphosphonate

Following the procedure described in Example 10, 14.9 g. of 3-butyn-1-ol was reacted with 22.7 g. of 1-(phenyl)ethylphosphonic dichloride. The final product was distilled using an oil diffusion system, and collected at a pot temperature of 177–190° and a head temperature of 121–123° at 0.4 micron.

*Analysis.*—Calc'd for $C_{16}H_{19}O_3P$ (percent): C, 66.20; H, 6.60; P, 10.67. Found (percent): C, 66.46; H, 6.58; P, 10.36.

EXAMPLE 19

Preparation of di-3-butynyl 2,4-dichlorobenzylphosphonate

Following the procedure described in Example 10, 5.5 g. of 3-butyn-1-ol was reacted with 10.2 g. of 2,4-dichlorobenzylphosphonic dichloride. The final product was distilled using an oil diffusion system, and collected over a pot temperature of 206–210° and a head temperature of 146–148° at 0.1 micron.

*Analysis.*—Calc'd for $C_{15}H_{15}Cl_2O_3P$ (percent): C, 52.20; H, 4.38; P, 8.97. Found (percent): C, 52.28; H, 4.63; P, 8.71.

EXAMPLES 20 to 43

Following the general procedures exemplified above, a large number of compounds of this class are readily synthesized. The synergistic activity of typical phosphonates of this invention, in combination with typical and useful chrysanthemumates, is further illustrated in Table 6. These results were obtained following the procedure described in Example 2.

TABLE 6.—SYNERGISTIC INSECTICIDAL COMPOSITIONS

| Chrysanthemumate | Milligrams | Phosphonate | Milligrams | Mortality of houseflies, percent |
|---|---|---|---|---|
| Allethrin | 10<br>None<br>10 | Di-3-butynyl benxylphosphonate. | 50<br>50<br>None | 100<br>0<br>34 |
| (1-cyclohexene-1,2-dicarboximido) methyl chrysanthemumate. | 10<br>None<br>10 | Di-3-butynyl (1-phenylethyl)- phosphonate. | 50<br>50<br>None | 100<br>21<br>10 |
| Pyrethrins | 10<br>None<br>10 | Di-3-butynyl (2,4-dichlorobenzyl) phosphonate. | 50<br>50<br>None | 100<br>0<br>3 |
| Allethrin | 5<br>None<br>5 | Di-(1-methyl-2-propynyl) phenylphosphonate. | 50<br>50<br>None | 100<br>0<br>6 |
| Allethrin | 10<br>None<br>10 | Di-3-butynyl (3,4-dichlorobenzyl) phosphonate. | 50<br>50<br>None | 100<br>0<br>34 |
| (1-cyclohexene-1,2-dicarboximido) methyl chrysanthemumate. | 10<br>None<br>10 | Bis(1-methyl-2-propynyl) (4-chlorobenzyl)- phosphonate. | 50<br>50<br>None | 100<br>0<br>10 |
| Cyclethrin | 10<br>None<br>10 | Di-2-propynyl (4-chlorobenzyl)- phosphonate. | 50<br>50<br>None | 98<br>0<br>12 |
| Allethrin | 10<br>None<br>10 | Di-4-pentynyl (4-chlorophenyl)- phosphonate. | 50<br>50<br>None | 100<br>0<br>34 |
| Pyrethrins | 5<br>None<br>5 | Di-2-propynyl (2-methylbenzyl)- phosphonate. | 50<br>50<br>None | 44<br>0<br>4 |
| Allethrin | 5<br>None<br>5 | Di-2-propynyl phenylphosphonate. | 50<br>50<br>None | 97<br>0<br>6 |
| (1-cyclohexene-1,2-dicarboximido) methyl chrysanthemumate. | 10<br>None<br>10 | Di-4-pentynyl phenylphosphonate. | 50<br>50<br>None | 100<br>0<br>10 |
| Allethrin | 5<br>None<br>5 | Di-2-propynyl phenylphosphonothioate. | 50<br>50<br>None | 92<br>0<br>6 |
| Allethrin | 10<br>None<br>10 | Di-(1-methyl-3-butynyl) phenylphosphonate. | 50<br>50<br>None | 97<br>0<br>34 |
| Allethrin | 10<br>None<br>10 | Di-3-butynyl [4,5-(methylenedioxy)-2-propyl-benzyl]-phosphonate. | 50<br>50<br>None | 100<br>0<br>34 |
| Allethrin | 10<br>None<br>10 | Di-3-butynyl (diphenyl-methyl)-phosphonate. | 50<br>50<br>None | 100<br>18<br>34 |
| Pyrethrin | 10<br>None<br>10 | Di-3-butynyl (4-fluoro-benzyl)-phosphonate. | 50<br>50<br>None | 100<br>0<br>3 |
| Pyrethrin | 10<br>None<br>10 | Di-3-butynyl (4-bromobenzyl)- phosphonate. | 50<br>50<br>None | 100<br>7<br>3 |
| Allethrin | 10<br>None<br>10 | Di-3-butynyl (3-chlorobenzyl)-phosphonate. | 50<br>50<br>None | 100<br>0<br>34 |
| Allethrin | 10<br>None<br>10 | Bis(1-propyl-2-propynyl) (4-chlorobenzyl) phosphonate. | 50<br>50<br>None | 94<br>0<br>34 |
| Cyclethrin | 10<br>None<br>10 | Bis(1-methyl-2-propynyl) (4-chlorobenzyl)- phosphonate. | 50<br>50<br>None | 100<br>0<br>12 |
| Pyrethrin | 10<br>None<br>10 | Bis(1-methyl-3-butynyl) (4-chlorobenzyl)-phosphonate. | 50<br>50<br>None | 95<br>8<br>3 |
| (1-cyclohexene-1,2,-dicarboximido) methyl chrysanthemumate. | 10<br>None<br>10 | Di-3-butynyl (4-nitro-benzyl-)-phosphonate. | 50<br>50<br>None | 100<br>0<br>10 |
| Allethrin | 10<br>None<br>10 | Di-3-butynyl (2-phenylethyl)-phosphonate. | 50<br>50<br>None | 100<br>8<br>34 |
| Allethrin | 10<br>None<br>10 | Di-3-butynyl (3-phenylpropyl)-phosphonate. | 50<br>50<br>None | 100<br>10<br>34 |

Many other synergistic combinations, in addition to those specifically exemplified herein, will be obvious in view of the teachings hereof. The novel synergistic combinations described herein are effective over a wide range of proportions of components, as illustrated in the following example:

EXAMPLE 48

The method used was the Official Method of the Chemical Specialties Manufacturers Association for evaluating liquid household insecticides against flying insects, 1961 Revision, as described in Soap and Chemical Specialties, 1961 Blue Book, pp. 237–239. This procedure was followed, employing groups of 100 to 300 houseflies for each replicate, and test compositions prepared as follows: Fifty mg. of (1-cyclohexene-1,2-dicarboximido)-methyl chrysanthemumate and the desired amount of di-3-butynyl phenylphosphonate were added to 200 ml. of a solvent blend consisting of approximately 4.5% methylene chloride and 95.5% petroleum distillate. These test compositions were applied to the chambers in the amount of 12.0 ml. of composition per 216 cubic feet. After 24 hours the mortality was determined by physical counting of the dead and living flies. Two to six replicates were run, including controls containing the separate components of this synergistic combination. Results, shown in Table 7, are given in mg. per 100 ml. of composition.

TABLE 7.—INSECTICIDAL ACTIVITY OF VARYING RATIOS OF COMPONENTS

| Chrysanthemumate, milligrams | Phosphonate, milligrams | Ratio | Knockdown 10 minutes, percent | Mortality 24 hours, percent |
|---|---|---|---|---|
| 25 | None | | 80 | 8 |
| None | 25 | | 0 | 0 |
| None | 500 | | 2 | 2 |
| 25 | 25 | 1:1 | 94 | 37 |
| 25 | 50 | 1:2 | 95 | 36 |
| 25 | 125 | 1:5 | 96 | 68 |
| 25 | 200 | 1:8 | 94 | 87 |
| 25 | 250 | 1:10 | 96 | 94 |
| 25 | 500 | 1:20 | 96 | 95 |

As shown in Table 7, even at relatively low proportions of (1-cyclohexene-1,2-dicarboximido)methyl chrysanthemumate and di-3-butynyl phenylphosphonate a marked synergistic effect is observed. With this particular combination of components the optimum ratio is shown to be over about 1:8, and of course synergistic effectiveness is maintained at higher ratios of phosphonate to chrysanthemumate. Note, however, that even 500 mg. of the phosphonate alone killed only 2% of the test insects. It is of particular interest to observe that this phosphonate enhances to an unusual extent the percent kill of this chrysanthemumate, which by itself exhibits good knockdown of houseflies but very poor permanent effectiveness.

In addition to the specific di-ω-alkynyl phenyl- and benzylphosphonates exemplified herein, similar synergistic behavior characterizes the other members of the class described, including but not limited to the following:

Bis(1-methyl-3-butynyl) (3-chlorophenyl)phosphonate;
di-5-hexynyl (4-chlorophenyl)phosphonate;
3-butynyl 2-propynyl (2-chlorophenyl)phosphorothionate;
di-5-hexynyl (2,4,5-trichlorophenyl)phosphonate;
di-4-pentynyl (2,3,6-trichlorobenzyl)phosphonate;
di-3-butynyl (2,3,4,6-tetrachlorophenyl)phosphonate;
di-3-butynyl (2,3,4,5,6-pentachlorophenyl)phosphonate;
di-6-heptynyl phenylphosphonothionate;
di-7-octynyl benzylphosphonate;
3-butynyl 1-methyl-2-propynyl benzylphosphonothionate;
bis(2-methyl-3-butynyl) (3-methylbenzyl)phosphonate;
bis(2-methyl-4-pentynyl) (4-ethylphenyl)phosphonate;
bis(4-methyl-5-hexynyl) (2-bromophenyl)phosphonate;
bis(1-methyl-4-pentynyl) [(chloro)-(4-chlorophenyl)methyl]phosphonate;
di-3-butynyl [4-(methylthio)benzyl]phosphonate;
bis(1,1-dimethyl-3-butynyl) benzylphosphonate;
bis(1-methyl-5-hexynyl) phenylphosphonate;
di-3-butynyl [4-(propylthio)phenyl]phosphonate;
di-3-butynyl (1-phenylpropyl)phosphonate;
bis(2-ethyl-3-butynyl) (2-propylphenyl)phosphonate;
di-3-butynyl (4-isopropylphenyl)phosphonate;
di-2-propynyl [4-(ethylthio)benzyl]phosphonate;
di-2-propynyl (3,4-dimethoxyphenyl)phosphonate;
bis(1-ethyl-2-methyl-3-butynyl) (4-cyanobenzyl)phosphonate;
di-3-butynyl (4-iodobenzyl)phosphonate;
di-3-butynyl (2-ethoxybenzyl)phosphonate;
di-3-butynyl (4-acetoxyphenyl)phosphonate;
bis(3-ethyl-4-pentynyl) (2-chloro-4-methoxybenzyl)phosphonate;
di-3-butynyl (4-propionyloxybenzyl)phosphonate;
di-2-propynyl [2-(methoxycarbonyloxy)phenyl]phosphonate;
di-2-propynyl [4-(ethoxycarbonyloxy)benzyl]phosphonate;
di-3-butynyl [3-(diethylcarbamyloxy)phenyl]phosphonate;
bis(2-ethyl-1,3,3-trimethyl-5-hexynyl) [4-(acetylamino)phenyl]phosphonate;
di-3-butynyl [4-(dimethylamino)phenyl]phosphonate;
di-3-butynyl [3-(diethylamino)phenyl]phosphonate;
di-2-propynyl (3-acetylphenyl)phosphonate;
di-3-butynyl (4-propionylbenzyl)phosphonate;
di-2-propynyl [2-(methoxycarbonyl)benzyl]phosphonate;
di-3-butynyl [4-(ethoxycarbonyl)phenyl]phosphonate;
di-3-butynyl [di-(4-chlorophenyl)methyl]phosphonate;
di-3-butynyl [(4-chlorophenyl)(phenyl)methyl]phosphonate;
di-4-pentynyl [di(4-methoxyphenyl)methyl]phosphonothionate;
bis(1-propyl-2-propynyl) [(4-chlorophenyl)(ethoxy)methyl]phosphonate;
di-3-butynyl [(2,4-dichlorophenyl)(methoxy)methyl]phosphonate;
di-2-propynyl [1-(3,4-dichlorophenyl)pentyl]phosphonate;
di-3-butynyl [(bromo)(phenyl)methyl]phosphonate;
bis(1-ethyl-2-propynyl)phenylphosphonate;
bis(1-ethyl-3-butynyl)benzylphosphonothionate;
bis(1-methyl-2-propynyl) (3,4-dibromobenzyl)phosphonate;
bis(2-methyl-3-butynyl) (3-nitrobenzyl)phosphonate;
bis(1-methyl-3-butynyl) (3-chloro-4-nitrobenzyl)phosphonate;
di-3-butynyl (3-chloro-4-methylphenyl)phosphonate;
di-2-propynyl (3-chloro-4-methylphenyl)phosphonothionate;
bis(1-methyl-1-propyl-4-pentynyl) [2-(3,4-dichlorophenyl)-1,2-dimethylethyl]phosphonate; and
bis(1-ethyl-2-propynyl) (4-chlorobenzyl)phosphonate.

The novel synergists of this invention may be prepared by adaptation of the synthetic procedures illustrated above, as well as by other procedures. Some generally useful methods for the preparation of these compounds are discussed below.

These ω-alkynyl esters may be prepared by reaction of the appropriate alkynol, or a salt thereof, with the desired phosphonic dihalide, normally the dichloride, in the presence of a strong organic or inorganic base. Mixed esters may be prepared by standard procedures therefor, such as reaction with a mixture of alkynols, or successive reaction steps to prepare first the monoester and then the desired diester. The preparation of phosphonic dichlorides is described in detail by Sasse in Houben-Weyl, Methoden der Organischen Chemie, 4th Edition, Volume 12, page 348 et seq. Useful methods for the preparation of phosphonic dichlorides include their preparation from phosphorus trichloride, by first reacting with an appropriately substituted aromatic hydrocarbon to produce a phosphonous dichloride, which on reaction with elemental chlorine gives an arylphosphonium tetrachloride, which on hydrolysis produces the corresponding phosphonic acid. This phosphonic acid on reaction with phosphorus pentachloride or thionyl chloride gives the desired arylphosphonic dichloride. Treatment of the phosphonium tetrachloride with sulfur dioxide converts it directly to the phosphonic dichloride. Relatively pure products, free of undesired isomers, may be prepared by reaction of an aryldiazonium tetrafluoroboride with phosphorus trichloride to form the corresponding phosphonic acid, which is readily converted to the phosphonic dichloride.

Another useful preparative method employs the Michaelis-Arbusov reaction, wherein an aralkyl halide, preferably the chloride or bromide, is reacted with a trialkyl phosphite to form a dialkyl aralkylphosphonate, which is readily converted to the desired phosphonic dichloride. A modification of the Arbusov reaction (Kosolapoff, "Organophosphorus Compounds," John Wiley, New York, 1950, page 123) involves reaction of the arylalkyl halide with a metal salt of a dialkyl phosphite to give the corresponding dialkyl arylalkylphosphonate, which is then converted to the phosphonic dichloride.

In cases where the substituents on the aromatic ring, such as in the methylenedioxybenzyl compound, are susceptible to attack by the halogenating agents, reaction of the appropriately substituted benzyl iodide with ethyl phosphorodichloridite may be used to give the corresponding benzylphosphonic dichloride directly.

The analogous phosphonothionates may be prepared from the corresponding phosphonothioic dichlorides and the alkynol. Preparation of the required phosphonothioic dichloride is accomplished from starting materials similar to those for the phosphonic dichlorides. Treatment of the phosphonium tetrachlorides with the hydrogen sulfide or phosphorus pentasulfide gives directly the desired phosphonothioic dichloride. Aluminum chloride complexes, obtained when phosphorus trichloride reacts with a hydrocarbon in the presence of aluminum chloride, may be reacted directly with free sulfur, to yield the corresponding phosphonothioic dichloride. Reaction of a preformed phosphonic dichloride with phosphorus pentasulfide replaces the oxygen with sulfur, thus providing the corresponding phosphonothioic dichloride.

These and other procedures are readily adapted to produce aryl- and aralkylphosphonic dichlorides having the variety of substituents useful herein, by appropriate choice of starting materials and reaction conditions. These phosphonic dichlorides are reacted with the desired ω-alkynol by standard procedures, including those exemplified herein and other known procedures for the preparation of ω-alkynyl esters of phosphonic acids.

The novel synergists described herein have a degree of effectiveness which is not shared by closely related compounds. The nature and location of the unsaturated linkage has been found to have a marked effect on the synergistic effectiveness of this type of compound. Displacement of the acetylenic linkage from the terminal position diminishes the synergistic activity.

The synergistic compositions of this invention may be employed to control a variety of crop pests and household pests. They are not usually applied full strength, but are generally incorporated with the adjuvants and carriers normally employed for facilitating dispersion of active ingredients for insecticidal applications, recognizing the accepted fact that the formulation and mode of application may affect the activity of a material. Striking results are obtained when these compositions are applied as space sprays and aerosol sprays, for example, or are formulated into any of the diluted and extended types of formulations used in insecticidal practice, including dusts, wettable powders, emulsifiable concentrates, solutions, granulars, baits, and the like, for application to foliage, within enclosed areas, to surfaces, and wherever insect control is desired.

These synergistic compositions may be made into liquid concentrates by solution or emulsification in suitable liquids, and into solid concentrates by admixing the active components with talc, clays, and other solid carriers used in the insecticide art. Such concentrates normally contain about 5–80% of the toxic composition, and the rest inert material which includes dispersing agents, emulsifying agents, and wetting agents. For practical application, the concentrates are normally diluted with water or other liquid for liquid sprays, with liquefied propellants for aerosols, or with additional solid carrier for application as a dust or granular formulation. Baits are usually prepared by mixing such concentrates with a suitable insect food, such as mixtures of cornmeal and sugar, and insect attractants may also be present. The concentration of the active ingredients in the diluted formulations, as generally applied for control of insects, is normally in the range of about 0.001% to about 5%. Many variations of spraying and dusting compositions are well known in the art, as are the techniques for formulating and applying these compositions.

Employing the synergistic insecticidal compositions described herein, enhanced control is obtained of both crop and household pests, including insects against which the cyclopropane carboxylates are themselves effective, but at higher concentrations. This includes flying and crawling pests of the orders Coleoptera (beetles), Hemiptera (true bugs), Homoptera (aphids), Diptera (flies), Orthoptera (roaches), Acarina (mites and ticks), and Lepidoptera (butterflies and moths including their larvae). Because of the low mammalian toxicity of these compositions, they are preferred compositions for use in control of pests in an environment inhabited by man and animals, including control of flies, mosquitoes, ants, roaches, moths, ticks, and the like, as well as in uses such as packaging, food and grain protection, and garden, pet, and livestock uses.

The relative amounts of synergist and cyclopropanecarboxylate (chrysanthemumate) employed are not critical, in that a relatively minor amount, e.g., less than one part of synergist per part of chrysanthemumate, is effective in imparting a beneficial effect to the combination. From practical considerations, it is preferred to use larger amounts of synergist, for example, from five to twenty or more parts of synergist per part of cyclopropanecarboxylate. Even larger proportions of synergist may be employed without detriment, whether or not the optimum synergistic proportions have been achieved. It is clear that effective amounts of synergist should be employed in the compositions, that the components should be present in synergistic proportions, and that effective amounts of the compositions, to control the particular insect pests in the environment of infestation, should be applied.

It is apparent that many modifications may be made in the formulation and application of the compositions of this invention, without departing from the spirit and scope of our invention, and of the following claims:

We claim:

1. Compounds of the class

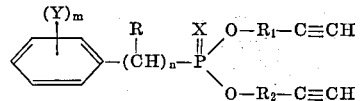

wherein $R_1$ and $R_2$ are each an alkylene group of one to about six carbon atoms having straight or branched chains; R is selected from the group consisting of hydrogen, halogen, phenyl, substituted phenyl, lower alkyl and lower alkoxy groups; $n$ is an integer of 1 to 3 inclusive; Y is selected from the group consisting of halogen, methylenedioxy, lower alkyl, lower alkoxy, lower alkylthio, nitro, cyano, acyloxy, acylamino, di(lower alkyl)amino, acyl, and alkoxycarbonyl groups; $m$ is an integer of 0 to 5 inclusive; and X is selected from the group consisting of oxygen and sulfur.

2. Compounds of the class

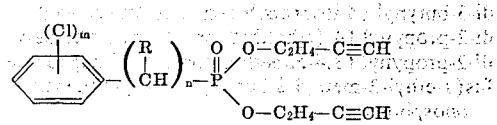

wherein R is selected from the group consisting of hydrogen and methyl, n is an integer of 0 to 1 inclusive, and m is an integer of 0 to 2 inclusive.

3. The compound of claim 2 of the formula di-3-butynyl phenylphosphonate.

4. The compound of claim 2 of the formula di-3-butynyl (4-chlorobenzyl)phosphonate.

5. The compound of claim 2 of the formula di-3-butynyl benzylphosphonate.

6. The compound of claim 2 of the formula di-3-butynyl 1-(phenyl)ethylphosphonate.

7. The compound of claim 2 of the formula di-3-butynyl 2,4-dichlorobenzylphosphonate.

8. The compound of claim 2 of the formula bis(1-methyl-2-propynyl)phenylphosphonate.

9. The compound of claim 2 of the formula di-3-butynyl 3,4-dichlorobenzylphosphonate.

References Cited

UNITED STATES PATENTS

| | | | |
|---|---|---|---|
| 2,425,765 | 8/1947 | Toy | 260—956 |
| 3,268,629 | 8/1966 | Cherbuliez et al. | 260—956 |

CHARLES B. PARKER, Primary Examiner

A. H. SUTTO, Assistant Examiner

U.S. Cl. X.R.

260—290, 340.5, 938, 940, 941, 944, 946, 949, 951, 952, 954; 424—200, 210, 211, 212, 214, 216, 218, 219